2,945,833

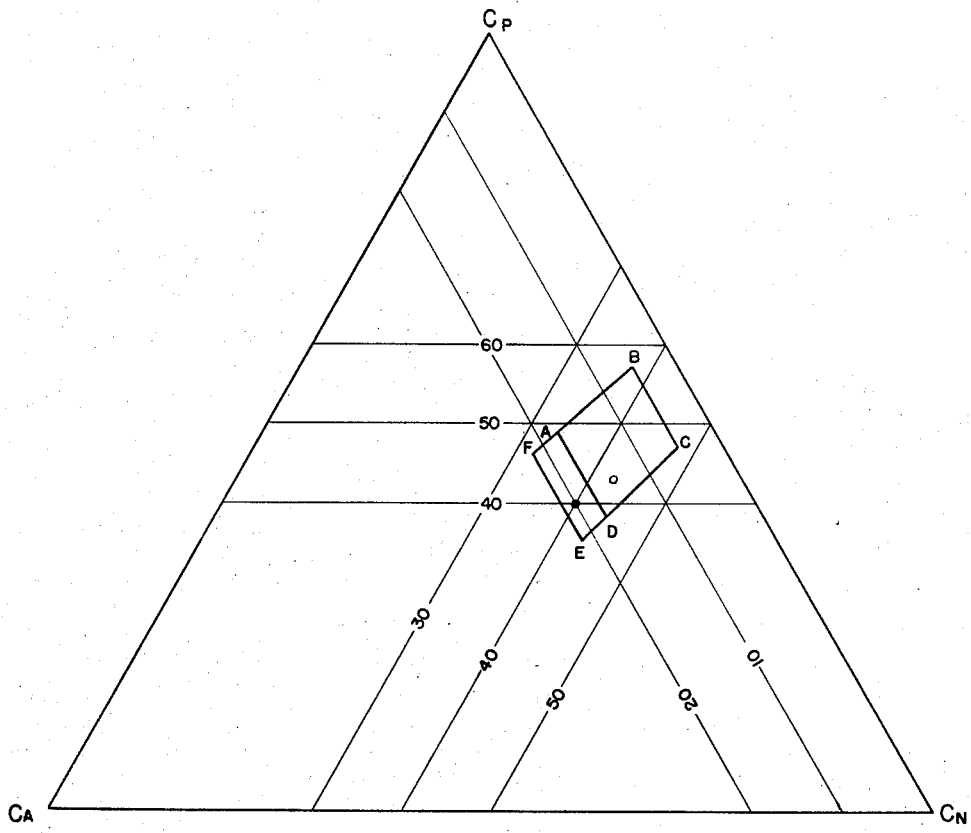
LEGEND:
- HYDROGENATED OIL A
- HYDROGENATED OIL B
INVENTOR.
ARCHIE B. HOEL
BY
ATTORNEY United States Patent Office 2,945,833
Patented July 19, 1960

RUBBER COMPOSITIONS CONTAINING HYDROGENATED MINERAL OIL AND METHOD OF PREPARATION

Archie B. Hoel, Drexel Hill, Pa., assignor to Sun Oil Company, Philadelphia, Pa., a corporation of New York Filed May 24, 1956, Ser. No. 587,024

10 Claims. (Cl. 260—33.6)

This invention relates to novel natural and synthetic rubber compositions, having improved properties with regard to color stability and non-staining properties, and to novel methods of preparing such compositions.

It is known in the art to employ mineral oil fractions, usually those having viscosity within the lubricating oil range, as plasticizers or extenders for natural or synthetic rubber compositions. However, the mineral oil fractions which have been used in the prior art have the disadvantage of causing rubber compositions containing such oils to stain various materials with which the rubber may come in contact. Also, the oils used previously have been found to be unsatisfactory when used in light colored rubber compositions, such as those used for making white sidewall automobile tires, flooring, hospital sheeting, infant's wear, footwear, etc., in that the light colored compositions containing such oils have poor color stability, with the result that they become discolored with the passage of time.

According to the invention, novel rubber composition containing mineral oil plasticizers or extenders are provided, which compositions have good color stability and non-staining properties. The oil which is employed according to the invention is one which has been subjected to hydrogenation conditions in order to convert a portion of the aromatic compounds, i.e. compounds containing at least one aromatic ring in the molecule into nonaromatic compounds. The hydrogenated oil employed according to the invention, though reduced in aromatic compound content, nevertheless contains at least 10 weight percent of aromatic compounds, and more preferably 20 to 45 weight percent of such compounds.

The mineral oil which is hydrogenated in order to prepare the plasticizer or extender for use according to the invention is preferably a mineral oil fraction having viscosity within the approximate range from 100 Saybolt seconds at 100° F. to 300 Saybolt seconds at 210° F. preferably, the oil prior to hydrogenation contains 15 to 50 weight percent of aromatic compounds. The aromatic compound content of the oil is substantially reduced as a result of the hydrogenation, and preferably the percent reduction in aromatic compound content is within the approximate range from 2 to 50%, more preferably within the approximate range from 5 to 25%, the percent reduction in aromatic compound content being determined by dividing the difference between the initial weight percent of aromatics and the final weight percent of the aromatics by the initial weight percent of aromatics.

The attached drawing is a diagram showing preferred compositions of hydrogenated oils for use according to the invention, and will be more fully described in connection with the example presented subsequently in this specification.

The partial hydrogenation according to the invention preferably results in a decrease in refractive index of the oil within the approximate range from 0.0002 to 0.02, and more preferably within the approximate range from 0.001 to 0.015. Preferably, the increase in aniline point is within the approximate range from 0.5° F. to 25° F., more preferably within the approximate range from 5° F. to 20° F.

Any suitable hydrogenation conditions can be employed to obtain the desired reduction in aromatic compound content of the oil, and in the light of the present specification, a person skilled in the art can determine for a given charge stock suitable hydrogenation conditions for accomplishing the desired reduction in aromatic compound content. Preferred hydrogenation temperatures are those within the approximate range from 450 to 750° F., more preferably 600° F. to 700° F. Preferred pressures in the hydrogenation are those within the approximate range from 150 p.s.i.g. to 2000 p.s.i.g., more preferably 250 p.s.i.g. to 1750 p.s.i.g. A preferred manner of contacting the hydrogenation charge with hydrogen and hydrogenation catalyst involves passing the hydrogenation charge downwardly through a stationary bed of hydrogenation catalyst in the presence of hydrogen. Preferred liquid hourly spaced velocities are those within the approximate range from 0.1 to 5.0 volumes of oil per volume of catalyst bed per hour.

Any of the well known hydrogenation catalysts can be employed in the hydrogenation, for example metals such as copper, magnesium, zinc, tin, vanadium, chromium, molybdenum, taungsten, manganese, cobalt, iron, nickel, platinum, etc., or oxides or sulfides of such metals, or combinations of a plurality of such metals, oxides or sulfides. Any suitable known support for the hydrogenation catalyst can be employed, for example activated carbon, alumina, bauxite, charcoal, clay, kieselguhr, magnesium oxide, pumice, silica, silica-alumina compositions, etc.

The invention is particularly advantageous in the preparation of white rubber compositions, such as those containing butadiene-styrene interpolymers prepared by special known methods for the production of rubber suitable for white rubber formulations. White rubber compositions generally contain a minor amount, for example 20 to 30 parts per 100 parts of rubber, of a material such as titanium dioxide, which imparts a white color to the rubber composition. The compositions also generally contain fillers, vulcanization accelerations, etc. as well known in the art. The amount of mineral oil plasticizer employed in such compositions is usually within the approximate range from 5 to 30 parts per 100 parts of butadiene-styrene interpolymer. In high Mooney viscosity polymers, e.g. those having raw Mooney (ML–4) viscosity of 80 to 240, on the other hand, larger amounts of oil as extender are generally employed, e.g. 10 to 120 parts of oil per 100 parts of polymer.

Other butadiene polymers and interpolymers, natural rubber, or isobutylene polymers such as butyl rubber, etc. can also be employed in the preparation of white rubber compositions and other compositions according to the invention. Butadiene interpolymers with acrylonitrile, acrylic acid esters and other monomers, as well known in the art for the preparation of rubber-like polymers with butadiene, can be employed according to the invention. Also, polymers of isoprene, chloroprene, etc., either alone or interpolymerized with other monomers such as styrene, acrylonitrile, etc., can also be employed.

The following example illustrates the invention:

A lubricating oil distillate from naphthenic base petroleum was employed as hydrogenation charge in this example. Two different portions of this oil were hydrogenated under different conditions, as set forth in the table below, thereby to produce hydrogenated oils having the properties listed in the table below, the two hydrogenated oils being identified by the letters A and B.

| | Charge Oil | Hydrogenated Oils | |
|---|---|---|---|
| | | A | B |
| Hydrogenation conditions: | | | |
| Temperature, °F | | 550 | 685. |
| Pressure, p.s.i.g. | | 175 | 1500. |
| Liquid hourly space velocity, vol./vol./hour. | | 1.9 | 0.5. |
| Catalyst | | 20% $MoS_2$ on alumina. | 20% $MoS_2$ on bauxite. |
| Oil properties: | | | |
| Viscosity, SUS/210° F | 86.3 | 85.5 | 77.2. |
| Refractive index, $n_D^{20}$ | 1.5222 | 1.5217 | 1.5110. |
| Aniline point, °F | 170.6 | 171.3 | 186.6. |
| Aromatics, wt. percent | 47.6 | 46.2 | 38.9. |
| Percent reduction in aromatics content. | | 2.9 | 18.3. |
| Nitrogen, wt. percent | 0.051 | 0.050 | 0.019. |
| Oxygen, wt. percent | 0.18 | 0.14 | 0.11. |
| Sulfur, wt. percent | 0.25 | 0.30 | 0.13. |
| % $C_A$ | 20.5 | 20 | 14.5. |
| % $C_N$ | 39.5 | 40 | 42.5. |
| % $C_P$ | 40 | 40 | 43. |

The aromatic compound content indicated in the above table refers to the weight percent of compounds containing at least one aromatic ring in the molecule. % $C_A$, % $C_N$, and % $C_P$, as indicated in the above table, refer to the percents of aromatic carbon atoms, naphthenic carbon atoms and paraffinic carbon atoms respectively, in the oil, as determined by the n–d–M carbon type analysis disclosed in the book "Aspects of the Constitution of Mineral Oils" by Van Nes and Van Westen (1951), beginning at page 335. The % $C_A$, % $C_N$ and % $C_P$ add up to 100, and are approximations of the proportions in the oil of carbon atoms occurring in aromatic rings, saturated ring structures, and acyclic chains respectively.

The charge oil and the two hydrogenated oils A and B were each used as plasticizer in the following white rubber composition.

|  | Parts by weight |
|---|---|
| Pale crepe rubber | 100 |
| Benzothiazyl disulfide | 0.5 |
| Dibutyl ammonium oleate | 0.5 |
| Zinc oxide | 50 |
| Titanium oxide | 30 |
| Stearic acid | 2 |
| Sulfur | 3 |
| Plasticizer | 10 |

The rubber compositions were cured at a temperature of 280° F. for one hour. The cured compositions were tested for color stability by placing thin sheets of the compositions under a sun lamp for 48 hours. The samples were attached to a rotating table 7 inches beneath the sun lamp, and the table was rotated during the test in order to provide uniform exposure of the various samples. The temperature of the test was about 125° F., the samples being heated to that temperature by the rays from the sun lamp. The sun lamp employed conformed to that described in ASTM specifications D925-51T and was a sunlight bulb RS-type, 275 watts and 110–125 volts.

The rubber composition containing the charge oil was a tan color after exposure, indicating a large amount of discoloration during the test. The rubber composition containing hydrogenated oil A exhibited substantially less discoloration than the charge oil, the exposed sample having a lighter tan color in the case of oil A than in the case of the charge oil. The rubber composition containing hydrogenated oil B exhibited only slight discoloration as a result of the test, the exposed sample being a very light cream color. The following table provides a comparison of the results:

| Oil | Color of Exposed Sample |
|---|---|
| Unhydrogenated | Deeper tan. |
| Hydrogenated, about 3 percent reduction in aromatics content. | Lighter tan. |
| Hydrogenated, about 18 percent reduction in aromatics content. | Very light cream color. |

These results show that hydrogenated oils provide white rubber compositions which are substantially superior in color stability to the oil prior to hydrogenation, and that the more severe hydrogenation conditions used to prepare hydrogenated oil B provide a superior hydrogenation product from this standpoint. Hydrogenated oil B gives very satisfactory results, since even in white rubber compositions containing no oil, there is some discoloration under the conditions of the test used here.

The hydrogenated oil A, though inferior to the hydrogenated oil B for use in white rubber compositions, has improved non-staining characteristics over unhydrogenated oils and can be used to advantage in black rubber compositions where non-staining characteristics are important, e.g. compositions for use as shock-absorbing strips for lining automobile doors. Oils such as the hydrogenated oil B are also highly suitable, of course, in such uses.

The attached drawing is a triangular diagram on which % $C_A$, % $C_N$ and % $C_P$, as previously defined, are plotted. The area BCEF on the drawing represents a preferred composition, and the area ABCD a more preferred composition, for the hydrogenated oil which is employed according to the invention. Hydrogenated oils A and B, as described in the preceding example, are identified by circles on the drawing, and it is seen that hydrogenated oil A lies outside the area ABCD, though inside the area BCEF, whereas hydrogenated oil B lies within the area ABCD.

The novel method according to the invention for preparing rubber compositions involves hydrogenating mineral oil to convert a portion of the aromatic hydrocarbons, i.e. hydrocarbon compounds containing at least one aromatic ring in the molecule, in the oil to non-aromatic hydrocarbons, i.e. hydrocarbon compounds containing no aromatic ring in the molecule, and compounding the hydrogenated oil with rubber. Preferred hydrogenation conditions and compounding proportions have been set forth previously.

In the appended claims, the term "plasticized" is a generic term including the term "extended," the concept of plasticizing including the concept of extending as well as of ordinary plasticizing.

The invention claimed is:

1. As a new composition of matter, rubber selected from the group consisting of natural rubber, synthetic homopolymers of conjugated dienes, and copolymers of conjugated dienes with ethylenically unsaturated monomers, plasticized with hydrogenated mineral oil containing at least 20 weight percent of aromatic hydrocarbons, and prepared by contacting a normally liquid mineral oil fraction containing not more than 50 weight percent of aromatic hydrocarbons with hydrogen to obtain 2 to 50 percent reduction in the weight percent of aromatic hydrocarbons.

2. Composition according to claim 1 wherein the hydrogenated mineral oil has composition within the area BCEF of the drawing.

3. Composition according to claim 1 wherein the hydrogenated mineral oil has composition within the area ABCD of the drawing.

4. Composition according to claim 1 wherein said mineral oil fraction is derived from naphthenic base crude petroleum.

5. Composition according to claim 1 wherein said mineral oil fraction has Saybolt Universal viscosity within the approximate range from 100 seconds at 100° F. to 300 seconds at 210° F., and wherein said hydrogenated mineral oil contains not more than 45 weight percent of aromatic hydrocarbons.

6. Method for preparing rubber compositions which comprises compounding rubber selected from the group consisting of natural rubber, synthetic homopolymers of conjugated dienes and copolymers of conjugated dienes with ethylenically unsaturated monomers, with hydrogenated mineral oil containing at least 20 weight percent of aromatic hydrocarbons and prepared by contacting a normally liquid mineral oil fraction containing not more than 50 weight percent of aromatic hydrocarbons with hydrogen to obtain 2 to 50 percent reduction in the weight percent of aromatic hydrocarbons.

7. Method according to claim 6 wherein the hydrogenation is carried out by contacting mineral oil with a solid hydrogenation catalyst at a temperature within the approximate range from 450° F. to 750° F. and a pressure within the approximate range from 150 p.s.i.g. to 2000 p.s.i.g.

8. Method according to claim 7 wherein said temperature is within the approximate range from 600° F. to 700° F.

9. In a white rubber composition comprising rubber selected from the group consisting of natural rubber, synthetic homopolymers of conjugated dienes and copolymers of conjugated dienes with ethylenically unsaturated monomers, a white pigment and a rubber processing oil, the improvement which comprises the presence in said rubber as said rubber processing oil of hydrogenated mineral oil containing at least 20 weight percent of aromatic hydrocarbons and prepared by contacting a normally liquid mineral oil fraction containing not more than 50 weight percent of aromatic hydrocarbons with hydrogen to obtain 2 to 50 percent reduction in the weight percent of aromatic hydrocarbons.

10. Composition according to claim 9 wherein said pigment is titanium dioxide.

References Cited in the file of this patent
UNITED STATES PATENTS 2,364,719    Jenkins _____ Dec. 12, 1944

OTHER REFERENCES

Dunstan et al.: "The Science of Petroleum," volume III, Oxford University Press, 1938, pages 2139–2148.

"Ind. and Engr. Chem.," volume 45, No. 5, May, 1953.